July 28, 1964
E. MANCUSO
3,142,215
TOOL HOLDER ASSEMBLY
Filed Dec. 13, 1960
2 Sheets-Sheet 1
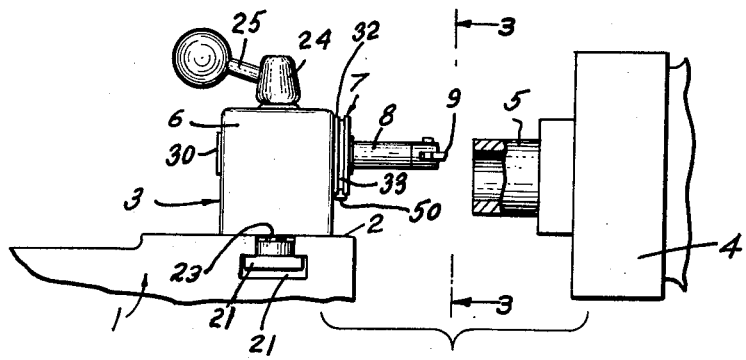
FIG. 1.
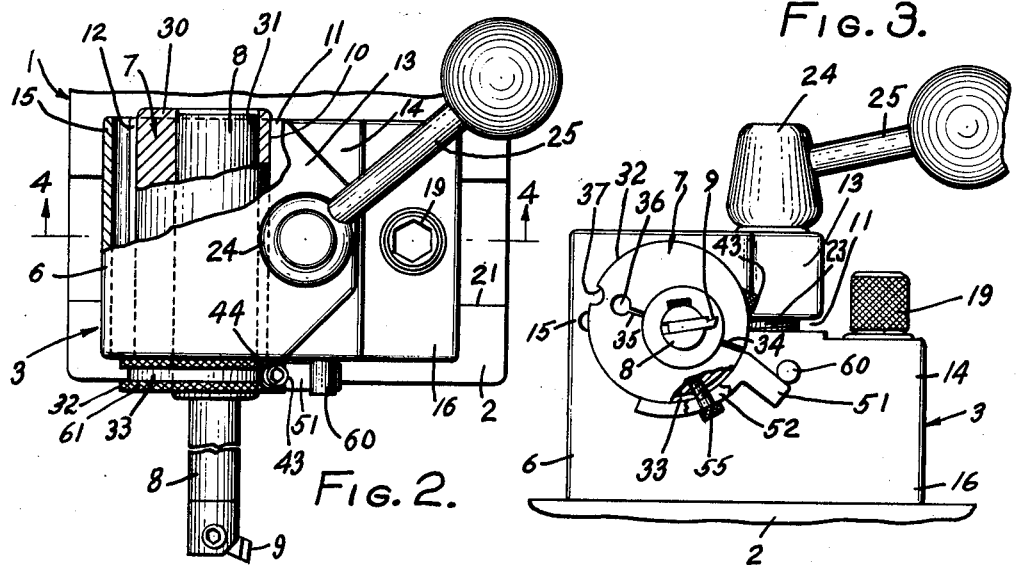
FIG. 2.
FIG. 3.
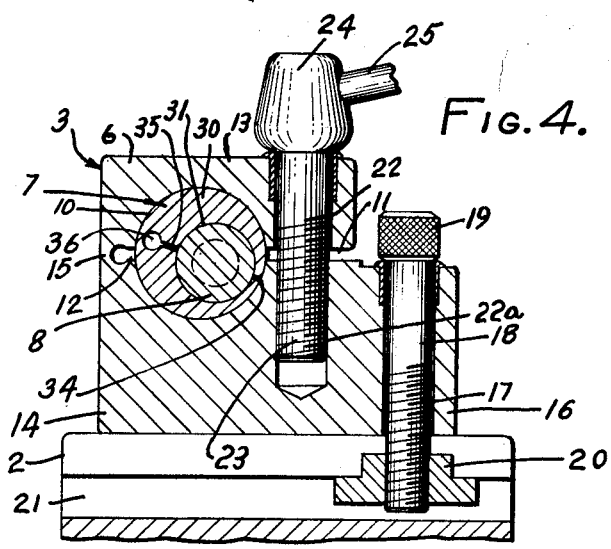
FIG. 4.
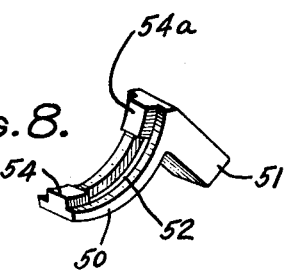
FIG. 8.
INVENTOR.
EMANUEL MANCUSO
BY Calvin Brown
ATTORNEY July 28, 1964  E. MANCUSO  3,142,215
TOOL HOLDER ASSEMBLY
Filed Dec. 13, 1960  2 Sheets-Sheet 2
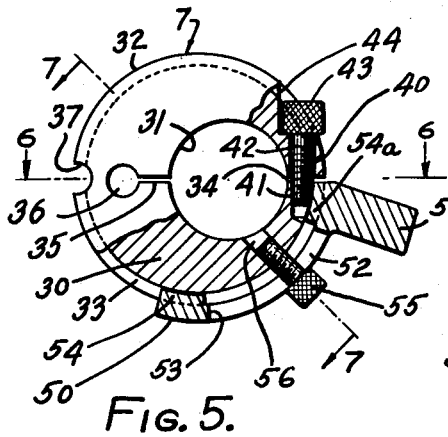
FIG. 5.
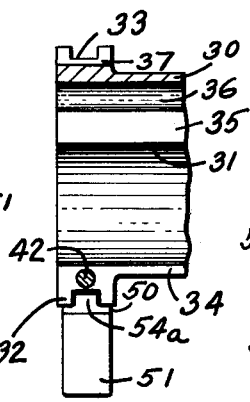
FIG. 6.
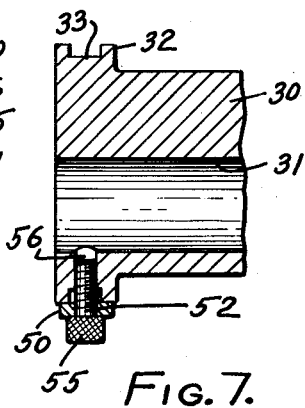
FIG. 7.
FIG. 10.
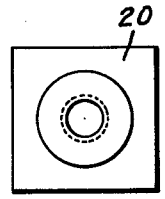
FIG. 9.
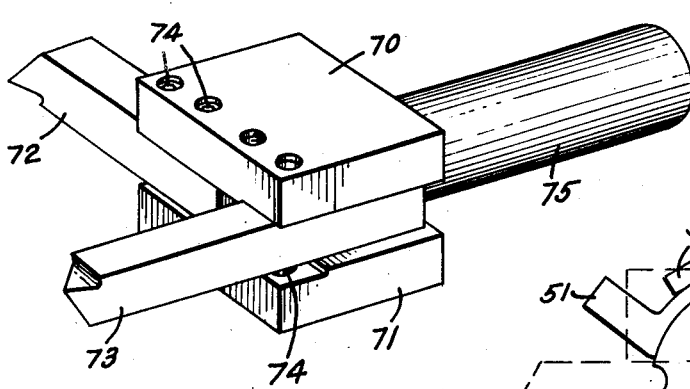
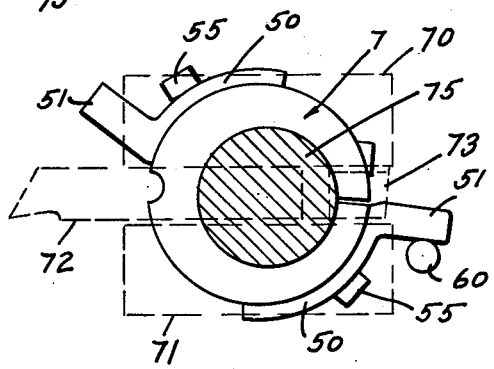
FIG. 11.
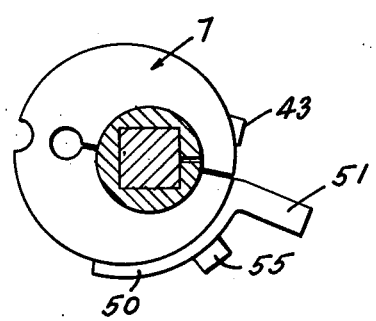
FIG. 12.
INVENTOR.
EMANUEL MANCUSO
BY
*Calvin Brown*
ATTORNEY

United States Patent Office 3,142,215
Patented July 28, 1964

3,142,215
TOOL HOLDER ASSEMBLY
Emanuel Mancuso, 3516 W. Alameda, Burbank, Calif.
Filed Dec. 13, 1960, Ser. No. 75,537
2 Claims. (Cl. 82—36)

The present invention relates to a tool holder assembly arranged to carry various cutters or cutting tools such as turning tools, boring bars, facing tools, etc.

An object of the present invention is to provide a construction which permits a given tool holder to be removed and replaced by a second tool holder carrying a given tool, and thereafter to remove the second tool holder and to reapply the first tool holder so that the first tool holder assumes exactly the same position as when first used.

A further object is the provision of a tool holder assembly which permits quick detachability from a suitable mounting, the tool holder having a preset adjustment relative to said mounting to permit its repeated mounting at a fixed position in the holder. The contruction is such as to permit the tool holder assembly, after being set for a given adjustment, to be quickly detached and replaced at precisely the same setting.

The device of the present invention is saving in time, is capable of duplicating work with precise results, inexpensive in cost of manufacture, not subject to disorder, and is generally superior to devices accomplishing a similar purpose now known to the inventor.

In the simplest embodiment of my invention I contemplate the use of a body or block which is detachably secured to the compound of an engine lathe and in such a manner as to permit the body or block to be moved transversely of the compound. The body or block is, of course, locked to the compound and the body or block is adapted to support and carry a series of collets. The collets are constructed in such a manner as to have eccentric bores of different diameters, or of the same diameter, depending on the use of the collets. Each collet is formed and constructed to carry a turning, boring, threading, or other forming tool of some character which is to have a definite position in the collet and in the carrying body or block fixed to the lathe compound. The construction is such that a boring bar having been correctly positioned in the collet, it may be brought to the same position regardless of the number of times the collet is removed from the body or block. Thus, accuracy of work is assured.

The inventor is aware that prior inventors in this art have attempted to achieve a construction which will permit the ready release and remounting of tools in a body or block. As a rule these devices must be carefully handled, usually depend upon having a fixed position on the compound of the lathe, or use adjustable feet for engagement with the compound. Such constructions are complicated in structure, require an expert machinist for proper adjustment, require that the lathe compound be kept clean, and have numerous other deficiencies tending to slow each operation by the machinist.

My invention is simple of structure, accurate in its results, even by the amateur machinist, and of few parts.

In the drawings:

FIGURE 1 is a fragmentary side elevation showing the present invention mounted on the compound of an engine lathe and directed toward work;

FIGURE 2 is a fragmentary, partially sectional plan view, on an enlarged scale, of the tool holder assembly;

FIGURE 3 is a fragmentary end elevation of the tool holder assembly looking in the direction of arrows 3 of FIGURE 2;

FIGURE 4 is a fragmentary sectional view, on the line 4—4 of FIGURE 2;

FIGURE 5 is a fragmentary sectional end elevation, on an enlarged scale, of a collet used in the practice of my invention;

FIGURE 6 is a fragmentary, sectional view on the line 6—6 of FIGURE 5;

FIGURE 7 is a fragmentary, sectional view on the line 7—7 of FIGURE 5;

FIGURE 8 is a perspective view of a locator shoe used with the collet of FIGURE 5;

FIGURE 9 is a plan view of a retaining member used in securing the body or block of the assembly to the lathe compound;

FIGURE 10 is a perspective view of a holder and a pair of square tool bits which may be employed in the practice of the present invention;

FIGURE 11 is an end elevation, partly in section, and illustrating the collet carrying the holder and associated bits shown in FIGURE 10; and FIGURE 12 is a sectional view of a collet carrying a square tool bit.

Referring now to the drawings, the engine lathe is shown in fragment in FIGURE 1 at 1, and the compound 2 of the lathe slidably supports the tool holder assembly designated generally as 3. The work carrier is shown at 4 with the work at 5. The work is revolved in the ordinary manner. The tool holder assembly 3 includes a compound slide body or block 6 adapted to carry a collet 7, the collet in turn receiving and holding a boring bar 8 of some type and in the present instance the boring bar carries a cutting blade 9.

The body or block 6 is formed with a transverse bore 10 and with a tranverse slot 11 which intersects the transverse bore 10 diametrically, extending beyond said bore 10, as shown at 12. This contruction provides for upper and lower jaws 13 and 14, the jaws being interconnected at 15. The lower jaw or base jaw extends forwardly of the upper jaw, as shown at 16. The jaw 14 is provided with a vertical bore 17 adapted to receive a bolt 18 having a socketed head 19 which bolt is passed through the compound for engagement with a retaining member 20 positioned within a T-slot 21 in the compound. When the bolt 18 is loose, the retaining member 20 and the body or block 6 may be moved relative to the T-slot for adjustment purposes. The lower and upper jaws are vertically bored, as shown at 22 and 22a with the bore 22a screw threaded to receive a threaded bolt 23. The bolt 23 carries a head 24 provided with an offset handle 25 whereby the jaws 13 and 14 may be caused to approach, due to the slot 11, when the bolt is tightened to the threads 22a.

The collet 7 comprises a cylindrical member 30 having a diameter sufficient to fit within the bore 10 of the body or block 6, and provided with an end-to-end eccentric bore 31. One end of the cylindrical member 30 is provided with a flange 32 and the flange is provided with a circumferential groove 33. The cylindrical member and its flange is provided with an end-to-end longitudinal slot 34 which transversely extends between the periphery of the cylindrical member and the bore 31 cutting the bore at a diametric point, see FIGURE 4. There is an end-to-end bore 36 in the cylinder, with a slot 35 lying in the plane of slot 34 and cutting bores 31 and 36. The flange 32 is provided with a semi-circular groove 37 which would be bisected by the slot 35 were it continued. This provides a weakened zone between the groove and the bore 36 and gives flexibility to movement of the two halves of the collet. As shown in FIGURE 5, the collet flange is bored at right angles to the plane of the slot 34, as shown at 40. This bore spans the slot and is screw threaded at 41 to receive a clamp screw 42. The screw has a socket head 43 fitting within a notched portion 44 of the flange. Obviously, a turning of the screw in one direction will close the slot 34 so as to deform the eccentric bore 31. The collet is formed of resilient material so as to spring back to its normal position when the clamp screw 42 is released. A locator shoe 50 is adjustably carried on the periphery of the flange 32. The shoe subtends a given arc of the flange. One end of the shoe is provided with an offset arm 51 and the shoe is provided with an elongated slot 52 extending from the arm to a point adjacent the opposite end of the shoe, as shown at 53. The shoe is provided with a pair of guide lugs 54 and 54a at each end of the shoe. These guide lugs are of a size adapted to permit their fitting within the circumferential groove 33 of the flange and obviously guide movement of the shoe as it is moved on the periphery of the flange. The shoe may be locked in position relative to the flange through the medium of a clamp screw 55, the screw shank of which is passed through the slot 52 of the shoe and received within a screw threaded bore 56, which diagonally extends through the flange and the cylindrical body. Obviously, when the clamp screw is tightened, the shoe is held in a given position relative to the flange. As shown in FIGURES 2 and 3, the offset arm 51 of the locater shoe is adapted to engage a stop pin 60 extending outwardly from one side of the body or block 6. It is also to be observed that the periphery of the flange is knurled, as shown at 61. This permits the collet as an entirety to be readily inserted within the bore of the body or block or removed therefrom and, likewise, to turn the collet within said bore for adjustment purposes.

In FIGURE 10 I have illustrated a square turret comprising a pair of plates 70 and 71 between which are positioned one or more square tool bits 72 and 73, the square being clamped against said bits by means of clamp screws 74 passed between the plates, and which plates likewise carry a round shank 75, which is adapted to be received within the eccentric bore of a collet. This shows another adaptation of the invention for different types of tool bits.

In FIGURE 12 the boring bar, which is received within the eccentric bore of the collet, carries a single square tool bit. In FIGURE 11 the flange of the collet is provided with two locator shoes, each locator shoe being secured to the flange of the collet in the same manner as has been described for FIGURE 5. This structure permits proper indexing for both square tool bits, as shown in FIGURE 10 at 72 and 73.

The operation, uses, and advantages of the invention are as follows:

Assuming that a boring bar with its cutting blade, as shown at 8 and 9, are to be placed within the eccentric bore of a collet and to be adjusted to a given position in the body or block 6 relative to work 5, the bolt 18 is loosened so that the block may be moved to a given selected position relative to the lathe compound. The offset clamping handle is turned so that the bolt 23 allows separation of the upper and lower jaws 13 and 14 to the end that the collet may be inserted in the bore 10. The boring bar 8 with its cutting blade 9 has previously been inserted in the bore 31 of the collet. The bore 31 of the collet, by being eccentric, allows a turning of the boring bar so as to elevate or depress the cutting blade, as shown, for instance, in FIGURE 3. Having selected the position for the boring bar within the eccentric bore of the collet, the adjusting screw 42 may be tightened which will clamp the boring bar within the collet bore 31. As the cutting blade will have a certain angle, relative to work, it is important that the locator shoe be adjusted which is accomplished by loosening the screw 55 to permit the offset end 51 to engage the stop pin 60 whereupon the clamp screw 55 is tightened. If the adjustments have been properly made, the collet is then clamped within the bore 10 by turning the offset arm 25 to clamp the upper and lower jaws 13 and 14 against the collet. Adjustment of the collet relative to the locator shoe and its stop pin 60 has now been established, and if it is desired to use a further collet having a different diameter eccentric bore with a different tool holder therein, or with the same type of tool carried by a boring bar, the collet may be easily removed from the bore of the body or block upon a loosening of the screw 23 by turning the offset clamping handle 25. Other collets may then be inserted and adjusted, or if this act has already been performed, readily inserted within the bore of the body with the locator shoe offset arm brought into position against the stop pin 60 followed by clamping the collet within the body or block. Further operation on the work then proceeds. If for any reason one of the collets as previously used, must again be employed, the collet may be inserted within the bore 10 of the body or block and the offset arm of the locator shoe brought against the stop pin 60 followed by locking the collet within the body and operation may be resumed with assurance that the precise same setting for the cutting operation is attained. The same is true for the constructions shown in FIGURES 10, 11 and 12. All that need be done is to place the locator shoe or shoes with its offset arm in position against the stop pin 60 and to lock the collet in the body with assurance that the tool, regardless of the number of times the collet is removed, will have a fixed set position each time the collet is applied to the body or block.

I claim:

1. A tool holder assembly for use in a lathe in which a workpiece is rotated about a work axis and acted on by a cutting tool, the cutting tool being carried by a compound slide block which may be moved in a slide plane which is parallel to the workpiece, the compound slide block formed with a bore, comprising: a collet having a cylindrical body for reception in the bore of the compound slide block, said collet body formed with an eccentric bore for receiving a boring bar carrying a cutting tool, one end of said collet body provided with a circular flange formed with a circumferential groove, an arcuate shoe carried on the periphery of said circular flange and provided with lugs received in the circumferential groove of the circular flange, the arcuate shoe provided at one end with an offset arm and the compound slide block provided with a pin for contact with the offset shoe arm to rotatively adjust the collet body and cutting tool as to cutting position, and means for locking the arcuate shoe to the collet flange.

2. A cutting tool assembly for lathes which includes a compound slide block for holding a boring bar, comprising: a collet having a cylindrical body and provided at one end of the body with a circular flange, said collet body provided with an eccentric bore extending from end to end thereof, said collet body and circular flange provided with longitudinal diametric slots, one slot of which extends between the surface of the collet body and the eccentric bore and the other slot of which extends to the eccentric bore and partly within the body of the collet, said eccentric bore of the collet body adapted to receive a boring bar provided with a cutter tool, and means for causing approach of the collet body portions adjacent the slots to clamp the boring bar within the eccentric bore of the collet body; a locator shoe carried by the circular flange of the collet body, means for adjusting the position of the locator shoe on said circular flange, said locator shoe provided with an offset arm and said compound slide block provided with a pin for contact with the offset arm of the locator shoe and whereby the position of the boring bar and its cutter tool may be brought repeatedly to the same position for contact with work.

References Cited in the file of this patent

UNITED STATES PATENTS

| | | |
|---|---|---|
| 1,189,926 | Ellis | July 4, 1916 |
| 1,506,034 | Swanson | Aug. 26, 1924 |
| 2,366,370 | Terwilliger | Jan. 2, 1945 |
| 2,445,634 | Plumb | July 20, 1948 |
| 2,745,306 | Schmidt | May 15, 1956 |

FOREIGN PATENTS

| | | |
|---|---|---|
| 335,581 | Switzerland | Feb. 28, 1959 |